(12) United States Patent
Wright et al.

(10) Patent No.: US 9,003,021 B2
(45) Date of Patent: Apr. 7, 2015

(54) MANAGEMENT OF STORAGE SYSTEM ACCESS BASED ON CLIENT PERFORMANCE AND CLUSER HEALTH

(75) Inventors: David D. Wright, Boulder, CO (US); Michael Xu, Boulder, CO (US)

(73) Assignee: Solidfire, Inc., Boulder, CO (US)

( * ) Notice: Subject to any disclaimer, the term of this patent is extended or adjusted under 35 U.S.C. 154(b) by 661 days.

(21) Appl. No.: 13/338,039

(22) Filed: Dec. 27, 2011

(65) Prior Publication Data

US 2013/0166727 A1   Jun. 27, 2013

(51) Int. Cl.
- *G06F 15/173* (2006.01)
- *G06F 3/06* (2006.01)
- *G06F 9/50* (2006.01)

(52) U.S. Cl.
CPC ............ *G06F 3/0613* (2013.01); *G06F 3/0659* (2013.01); *G06F 3/0688* (2013.01); *G06F 3/0689* (2013.01); *G06F 9/5083* (2013.01)

(58) Field of Classification Search
USPC .................................................. 709/223–226
See application file for complete search history.

(56) References Cited

U.S. PATENT DOCUMENTS

| | | | |
|---|---|---|---|
| 6,347,337 B1 * | 2/2002 | Shah et al. ..................... | 709/224 |
| 6,560,196 B1 * | 5/2003 | Wei .............................. | 370/230.1 |
| 6,604,155 B1 | 8/2003 | Chong, Jr. | |
| 6,741,698 B1 | 5/2004 | Jensen | |
| 7,110,913 B2 | 9/2006 | Monroe et al. | |
| 7,457,864 B2 | 11/2008 | Chambliss et al. | |
| 7,529,830 B2 | 5/2009 | Fujii | |
| 7,647,329 B1 | 1/2010 | Fischman et al. | |
| 8,156,016 B2 | 4/2012 | Zhang | |
| 8,214,868 B2 | 7/2012 | Hamilton et al. | |
| 8,369,217 B2 | 2/2013 | Bostica et al. | |
| 2002/0059274 A1 | 5/2002 | Hartsell et al. | |
| 2002/0112097 A1 | 8/2002 | Milovanovic et al. | |
| 2003/0028642 A1 | 2/2003 | Agarwal et al. | |
| 2003/0115204 A1 | 6/2003 | Greenblatt et al. | |
| 2003/0212872 A1 * | 11/2003 | Patterson et al. ............. | 711/165 |
| 2003/0223445 A1 * | 12/2003 | Lodha .......................... | 370/412 |
| 2004/0054656 A1 | 3/2004 | Leung et al. | |
| 2004/0107281 A1 | 6/2004 | Bose et al. | |
| 2004/0133622 A1 | 7/2004 | Clubb et al. | |
| 2006/0072555 A1 | 4/2006 | St. Hilaire et al. | |
| 2006/0072593 A1 | 4/2006 | Grippo et al. | |
| 2007/0041330 A1 | 2/2007 | Bostica et al. | |
| 2007/0094452 A1 | 4/2007 | Fachan | |
| 2007/0112723 A1 | 5/2007 | Alvarez et al. | |

(Continued)

OTHER PUBLICATIONS

Final Office Action received for U.S. Appl. No. 13/856,958 mailed Feb. 6, 2014 (21 pages).

(Continued)

*Primary Examiner* — Jason Recek
(74) *Attorney, Agent, or Firm* — Foley & Lardner LLP

(57) ABSTRACT

In one embodiment, a method includes determining a previous client performance value in terms of a performance metric for a volume in a storage system. The previous client performance value is related to previous access for a client to the volume. Also, the storage system is storing data for a plurality of volumes where data for each of the plurality of volumes is striped substantially evenly across drives of the storage system. The method applies criteria to the previous performance value to determine a target performance value. Performance of the client with respect to access to the volume is regulated in terms of the performance metric based on the target performance value.

20 Claims, 5 Drawing Sheets

(56) References Cited

U.S. PATENT DOCUMENTS

| | | | |
|---|---|---|---|
| 2007/0136269 A1* | 6/2007 | Yamakabe et al. | 707/4 |
| 2007/0250635 A1 | 10/2007 | Hamilton et al. | |
| 2007/0271391 A1 | 11/2007 | Fujii | |
| 2008/0201535 A1 | 8/2008 | Hara | |
| 2009/0077097 A1 | 3/2009 | Lacapra et al. | |
| 2010/0023726 A1 | 1/2010 | Aviles | |
| 2010/0223385 A1 | 9/2010 | Gulley et al. | |
| 2010/0250712 A1 | 9/2010 | Ellison et al. | |
| 2011/0022812 A1 | 1/2011 | Van Der Linden et al. | |
| 2011/0096675 A1 | 4/2011 | Li et al. | |
| 2011/0161293 A1 | 6/2011 | Vermeulen et al. | |
| 2011/0238857 A1 | 9/2011 | Certain et al. | |
| 2012/0124282 A1 | 5/2012 | Frank et al. | |
| 2012/0185437 A1* | 7/2012 | Pavlov et al. | 707/652 |
| 2012/0317353 A1 | 12/2012 | Webman et al. | |
| 2012/0317395 A1 | 12/2012 | Segev et al. | |
| 2013/0124776 A1 | 5/2013 | Hallak et al. | |
| 2013/0166724 A1 | 6/2013 | Bairavasundaram et al. | |
| 2013/0166727 A1 | 6/2013 | Wright et al. | |
| 2013/0173955 A1 | 7/2013 | Hallak et al. | |
| 2013/0305002 A1 | 11/2013 | Hallak et al. | |

OTHER PUBLICATIONS

Non-final Office Action issued in U.S. Appl. No. 13/856,958 mailed Jul. 31, 2013 (16 pages).

Final Office Action received in U.S. Appl. No. 13/856,997 mailed Dec. 4, 2013 (29 pages).

International Search Report and Written Opinion of the International Search Authority received in PCT/US12/71844 mailed Mar. 1, 2013 (12 pages).

Non-Final Office Action issued in U.S. Appl. No. 13/856,997 mailed Aug. 21, 2013 (20 pages).

* cited by examiner

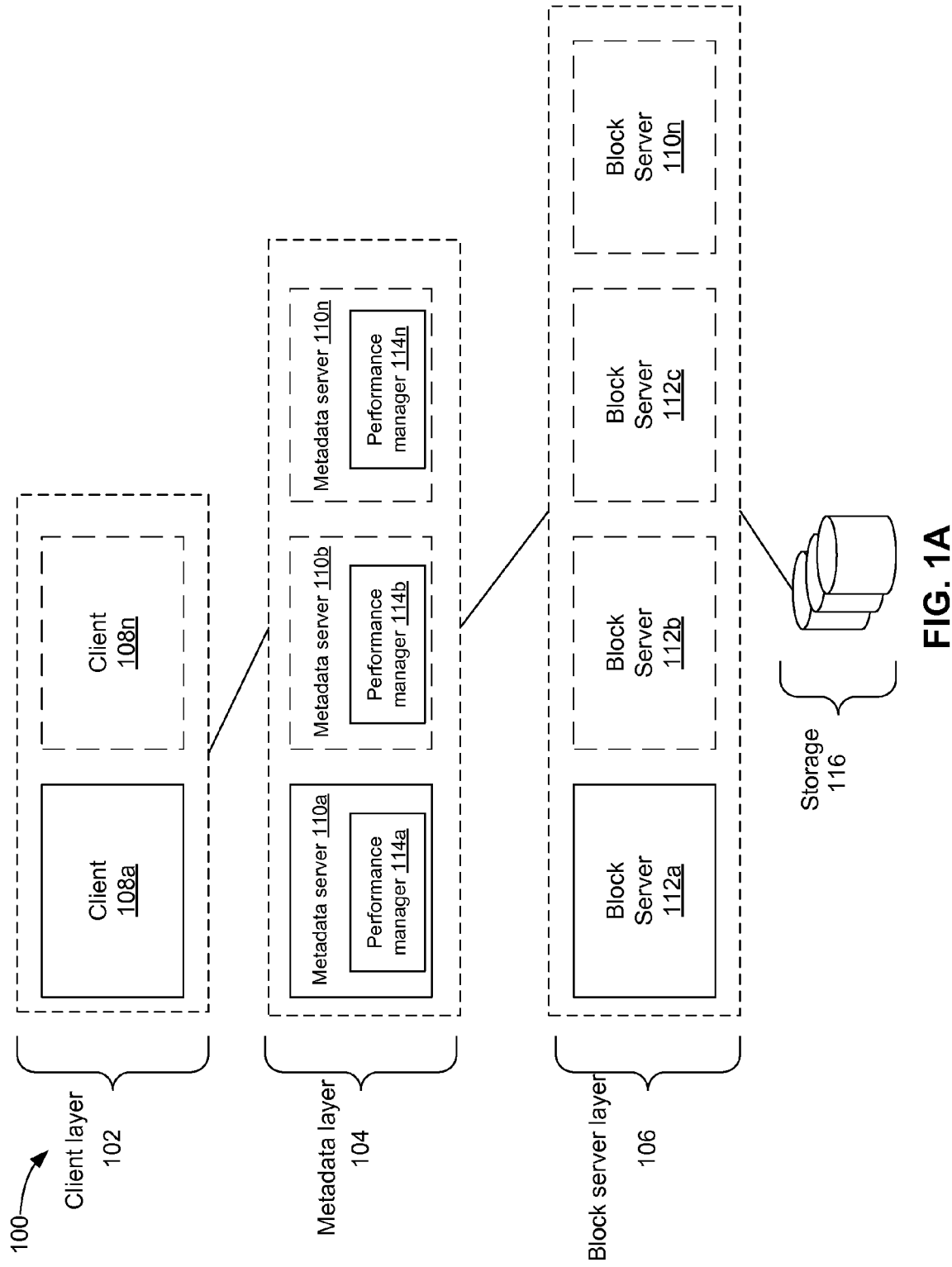

US 9,003,021 B2

MANAGEMENT OF STORAGE SYSTEM ACCESS BASED ON CLIENT PERFORMANCE AND CLUSER HEALTH

BACKGROUND

Particular embodiments generally relate to data storage systems.

In data storage architectures, a client's data may be stored in a volume. Typically, the volume's data resides on a small percentage of drives in a storage cluster. This leads to issues of hot spots where portions of the cluster are over-utilized while other portions of the cluster are under-utilized. For example, if a client is performing a large number of accesses of data in the volume, the load attributed to the small percentage of drives in which the data is stored increases resulting in a hot spot. This may result in a client experience that is inconsistent across all volumes of the cluster as some clients' may experience good performance if their data is stored on portions that are under-utilized and some clients' experience poor performance if their data is stored on over-utilized portions.

One way of attempting to provide a better client experience is using quality of service based on client prioritization. For example, clients may be assigned different priority levels. Based on these priority levels, access requests (e.g., read and write requests) for various clients are prioritized. Clients' access requests are dispatched based on the load of the cluster and a priority assigned to each client. For example, a client having a higher priority may have more access requests processed than another client having a lower priority during times when the cluster is experiencing higher load. Using the priority system only allows for a slightly better client experience. For example, priorities do not guarantee a specific, consistent level of performance and are based on the idea that the cluster is dividing its full performance amongst all clients all the time.

SUMMARY

In one embodiment, a method includes determining a previous client performance value in terms of a performance metric for a volume in a storage system. The previous client performance value is related to previous access for a client to the volume. Also, the storage system is storing data for a plurality of volumes where data for each of the plurality of volumes is striped substantially evenly across drives of the storage system. The method applies criteria to the previous performance value to determine a target performance value. Performance of the client with respect to access to the volume is regulated in terms of the performance metric based on the target performance value.

In one embodiment, an apparatus is provided including one or more computer processors; and a computer-readable storage medium comprising instructions for controlling the one or more computer processors to be operable to: determine a previous client performance value in terms of a performance metric for a volume in a storage system, the previous client performance value related to previous access for a client to the volume, wherein the storage system is storing data for a plurality of volumes where data for each of the plurality of volumes is striped substantially evenly across drives of the storage system; apply criteria to the previous performance value to determine a target performance value; and regulate performance of the client with respect to access to the volume in terms of the performance metric based on the target performance value.

In one embodiment, a non-transitory computer-readable storage medium is provided containing instructions for controlling a computer system to be operable to: determine a previous client performance value in terms of a performance metric for a volume in a storage system, the previous client performance value related to previous access for a client to the volume, wherein the storage system is storing data for a plurality of volumes where data for each of the plurality of volumes is striped substantially evenly across drives of the storage system; apply criteria to the previous performance value to determine a target performance value; and regulate performance of the client with respect to access to the volume in terms of the performance metric based on the target performance value.

The following detailed description and accompanying drawings provide a better understanding of the nature and advantages of the present invention.

BRIEF DESCRIPTION OF THE DRAWINGS

FIG. 1A depicts a simplified system for performance management in a distributed data storage system according to one embodiment.

DETAILED DESCRIPTION

Figure 1B:
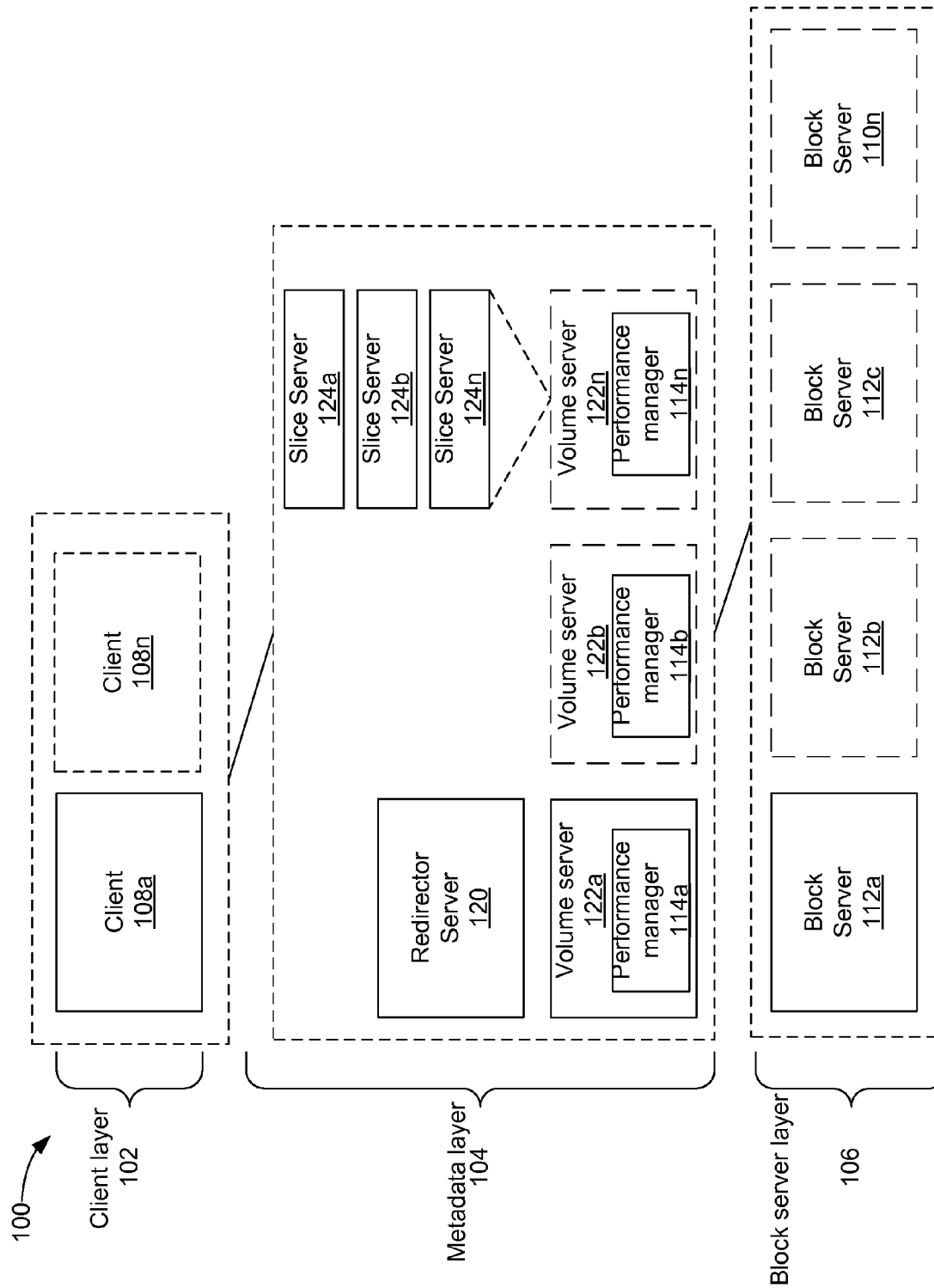
FIG. 1B depicts a more detailed example of system according to one embodiment.

Described herein are techniques for a performance management storage system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Performance Management Overview

FIG. 1A depicts a simplified system 100 for performance management in a distributed data storage system according to one embodiment. System 100 includes a client layer 102, a metadata layer 104, and a block server layer 106. A performance manager 114 monitors the performance of clients 108. Different performance metrics may be used to monitor performance, such as input/output operations per second (IOPS), bandwidth, or latency. IOPS may be real input/output operations per second that are measured for a specific client 108 on a volume of data. Bandwidth may be the amount of data that is being transferred between clients 108 and the volume of data. Latency may be the time taken for an access request to be satisfied. For example, how long a read request takes to read data from a volume and return the data to client 108. Other performance metrics may also be appreciated.

Storage 116 may be a storage system including multiple drives. In one embodiment storage 116 may be a cluster of drives coupled together via a network. When the term cluster is used, it will be recognized that cluster may represent a storage system that includes multiple disks that may not be networked together. The drives may be of different medium formats. For example, electromechanical disk storage or solid state storage drives may be used. Electromechanical disk storage may include spinning disks that use movable read/write heads to read/write to/from different locations of the spinning disks. Inserting the read/write head at various random locations results in slower data access than if data is read from a sequential location. A solid state storage drive uses a solid state memory to store persistent data. Solid state drives (SSD) use microchips that store data in non-volatile memory chips and contain no moving parts. Also, solid state drives can perform random access and parallel reads/writes efficiently.

In one embodiment, storage 116 may include solid state drives. SSD allows random access to data in different drives in an optimized manner. For example, read or write requests to non-sequential portions of the drives may be performed in the same amount of time as compared to sequential reads or write requests. Conversely, if spinning disks were used, then a client's volume of data may be concentrated in a small portion of the cluster to avoid random access, which is slow for spinning disks.

In one embodiment, data system 100 stripes every volume data evenly across a cluster of drives in storage 116. Because the data for a volume is striped evenly across all of the drives in the cluster, every drive in the cluster is involved in the read and write paths of each volume, which balances the data and also load across all of the drives. This removes hot spots within the cluster and a consistent total aggregate performance of a cluster may be defined and achieved. Also, because SSD may be used, random access to data in different drives is optimized, and the data for a volume may be distributed evenly across the solid state drives while not comprising performance.

Performance manager 114 may monitor and regulate the performance of clients 108. Instead of applying a priority level to clients 108, the performance may be adjusted for each client 108. For example, based on a number of factors, such as previous client performance, cluster health, and performance parameters, a number of IOPS that can be performed by a client 108 over a period of time may be managed. In one embodiment, performance manager 114 regulates the number of IOPS that are performed by locking client 108 out of a volume for different amounts of time to manage how many IOPs can be performed by client 108. When client 108 is heavily restricted, client 108 may be locked out of accessing a volume for 450 milliseconds every 500 milliseconds and when client 108 is not heavily restricted, client 108 is blocked out of a volume every 50 milliseconds for every 500 milliseconds. The lock out effectively manages the amount of IOPs that client 108 can perform every 500 milliseconds. Although examples using IOPs are described, other performance metrics may also be used as will be described in more detail below.

The use of the performance metric to manage load in system 100 is possible because a client's affect on global cluster performance is predictable due to the evenness of distribution of load. For example, by locking out client 108 from accessing the cluster, the load in the cluster may be effectively managed. Because load is evenly distributed, reducing access to the client's volume reduces that client's load evenly across the cluster. However, conventional storage architectures where hot spots may occur result in unpredictable cluster performance. Thus, reducing access by a client may not alleviate the hot spots because the client may not be accessing the problem areas of the cluster. Thus, conventional systems may only offer quality of service based on prioritization. Furthermore, because an individual client's performance is evenly distributed, the performance of the cluster can be characterized globally, as opposed to hotspots where performance of the cluster can vary depending on location of data in the cluster.

Storage System

Before discussing how particular embodiments manage performance of clients 108, the structure of a possible system is described. Client layer 102 includes one or more clients 108a-108n. Metadata layer 104 includes one or more metadata servers 110a-110n. Performance managers 114 may be located on metadata servers 110a-110n. Block server layer 106 includes one or more block servers 112a-112n. Block servers 112a-112n are coupled to storage 116, which store volume data for clients 108. Each client 108 may be associated with a volume. In one embodiment, only one client 108 accesses data in a volume; however, multiple clients 108 may access data in a single volume.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one embodiment, one or more metadata servers 110 may be combined with one or more block servers 112 in a single machine. Entities in system 100 may be virtualized entities. For example, multiple virtual block servers 112 may be included on a machine. Entities may also be included in a cluster, where computing resources of the cluster are virtualized such that the computing resources appear as a single entity.

Clients 108 include client processes that may exist on one or more physical machines. When the term "client 108" is used in the disclosure, the action being performed may be performed by a client process. A client process is responsible for storing, retrieving, and deleting data in system 100. A client process may address pieces of data depending on the nature of the storage system and the format of the data stored. For example, the client process may reference data using a client address. The client address may take different forms. For example, in a storage system that uses file storage, client 108 may reference a particular volume or partition, and a file name. With object storage, the client address may be a unique object name. For block storage, the client address may be a volume or partition, and a block address. Clients 108 communicate with metadata layer 104 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

Block servers 112 store data for clients 108 in storage 116. In one embodiment, data may be broken up into one or more storage units. Data may be segmented into data blocks. Data blocks may be of a fixed size, may be initially a fixed size but compressed, or may be of a variable size. Data blocks may also be segmented based on the contextual content of the block in a larger data string. Maintaining segmentation of the blocks on a write (and corresponding re-assembly on a read) may occur in client layer 102 and/or metadata layer 104. Also, compression may occur in client layer 102, metadata layer 104, and/or block server layer 106.

In one example, data may be stored in a volume that is referenced by client 108. A volume may be made up of one or more volume slices. The data associated with the volume includes a list of volume slices for that volume. A volume slice is a list of blocks for a portion of a volume. A block is the raw data for a volume and may be the smallest addressable unit of data. In one embodiment, a data block may be referred to as a storage unit. However, a storage unit may also refer to other subsets of data. For discussion purposes, the term data block will be used instead of a storage unit.

Data blocks may be stored in storage 116 based on unique block identifiers. A block identifier is an identifier that is determined based on the content of the data block, such as by a hash of the content. The block identifier is unique to that block of data. For example, blocks with the same content have the same block identifier, but blocks with different content have different block identifiers. Block servers 112 maintain a mapping between a block identifier and the location of the data block in a storage medium of block server 112. The unique identifier has the property of being uniformly random, such that sections or the entire identifier are used to decide the distribution of every piece of data, such that the total storage use is even throughout the cluster. A volume includes these unique and uniformly random identifiers, and so a volume's data is also evenly distributed throughout the cluster.

Metadata layer 104 stores metadata that maps between client layer 102 and block server layer 106. For example, metadata servers 110 map between the client addressing used by clients 108 (e.g., file names, object names, block numbers, etc.) and block layer addressing (e.g., block identifiers) used in block server layer 106. Clients 108 may perform access based on client addresses. However, block servers 112 do not store data based on client addresses. Rather, as will be discussed in more detail below, block servers 112 store data based on unique block identifiers for the data.

FIG. 1B depicts a more detailed example of system 100 according to one embodiment. Metadata layer 104 may include a redirector server 120 and multiple volume servers 122. Each volume server 122 may be associated with a plurality of slice servers 124.

In this example, client 108a wants to connect to a volume (e.g., client address). Client 108a communicates with redirector server 120, identifies itself by initiator name, and also indicates a volume by target name that client 108a wants to connect to. Different volume servers 122 may be responsible for different volumes. In this case, redirector server 120 is used to redirect the client to a specific volume server 122. To client 108, redirector server 120 may represent a single point of contact. The first request from client 108a then is redirected to a specific volume server 122. For example, redirector server 120 may use a database of volumes to determine which volume server 122 is a primary volume server for the requested target name. The request from client 108a is then directed to the specific volume server 122 causing client 108a to connect directly to the specific volume server 122. Communications between client 108a and the specific volume server 122 may then proceed without redirector server 120.

Volume server 122 performs functions as described with respect to metadata server 110. Additionally, each volume server 112 includes a performance manager 114. For each volume hosted by volume server 122, a list of block identifiers is stored with one block identifier for each logical block on the volume. Each volume may be replicated between one or more volume servers 122 and the metadata for each volume may be synchronized between each of the volume servers 122 hosting that volume. If volume server 122 fails, redirector server 120 may direct client 108 to an alternate volume server 122.

In one embodiment, the metadata being stored on volume server 122 may be too large for one volume server 122. Thus, multiple slice servers 124 may be associated with each volume server 122. The metadata may be divided into slices and a slice of metadata may be stored on each slice server 124. When a request for a volume is received at volume server 122, volume server 122 determines which slice server 124 contains metadata for that volume. Volume server 122 then routes the request to the appropriate slice server 124. Accordingly, slice server 124 adds an additional layer of abstraction to volume server 122.

The above structure allows striping of data evenly across the cluster of disks. For example, by storing data based on block identifiers, data can be evenly stripped across the cluster. When a client is locked out of a volume, metadata server 110 or volume server 112 may close the command window for client 108. In this case, metadata server 110 or volume server 112 may queue access requests for client 108.

Performance Management

Figure 2:
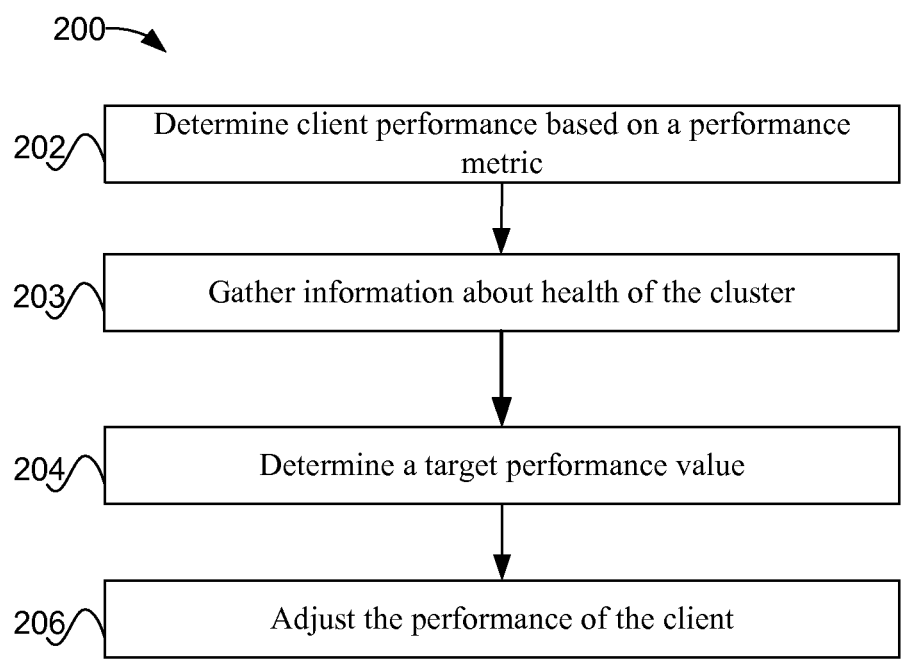
FIG. 2 depicts a simplified flowchart of a method of performing performance management according to one embodiment.

FIG. 2 depicts a simplified flowchart 200 of a method of performing performance management according to one embodiment. At 202, performance manager 114 determines client performance based on a performance metric. For example, performance manager 114 may measure a client's performance in different performance metrics, such as IOPs, bandwidth, and latency. The performance measured may be historical and/or current performance. Historical performance may measure previous performance for an amount of time, such as the last week of performance data. Current performance may be real-time performance data.

At 203, performance manager 114 gathers information about health of the cluster. The health of the cluster may be information that can quantify performance of the cluster. The cluster health information may be gathered from different parts of system 100, and may include health in many different aspects of system 100. The health information may not be cluster-wide, but may include information that is local to the volume server 122 that is performing the performance management. The cluster health may be affected, for example, if there is a cluster data rebuild occurring, total performance of the cluster may drop. Also, when data discarding is occurring, adding or removing of nodes, adding or removing of volumes, power failures, or other events affecting performance, performance manager 114 gathers this information from the cluster.

At 204, performance manager 114 determines a target performance value. For example, based on the client performance and the cluster health, a target performance value is determined. As will be described in more detail below, the target performance value may be based on different criteria, such as cluster health, client performance, and administrator specified performance parameters. The target performance value is the value that is performance manager 114 would like client 108 to operate at. For example, the target performance may be 110 IOPs.

At 206, performance manager 114 adjusts the performance of client 108. For example, the future client performance may be adjusted towards the target performance value. If IOPS are being measured as the performance metric, the number of IOPS a client 108 performs over a period of time may be adjusted to the target performance value. In one example, if the number of IOPS in the previous client performance is 80 and the target performance value is 110 IOPS, then the performance of the client is adjusted to allow client 108 to perform more IOPS such that the client's performance moves toward performing 110 IOPS.

The above process may be performed continuously over periods of time. For example, a period of 500 milliseconds is used to evaluate whether performance should be adjusted. As will be described in more detail below, client 108 may be locked out of performing IOPs for a certain amount of time each period to reduce or increase the number of IOPs being performed.

Figure 3:
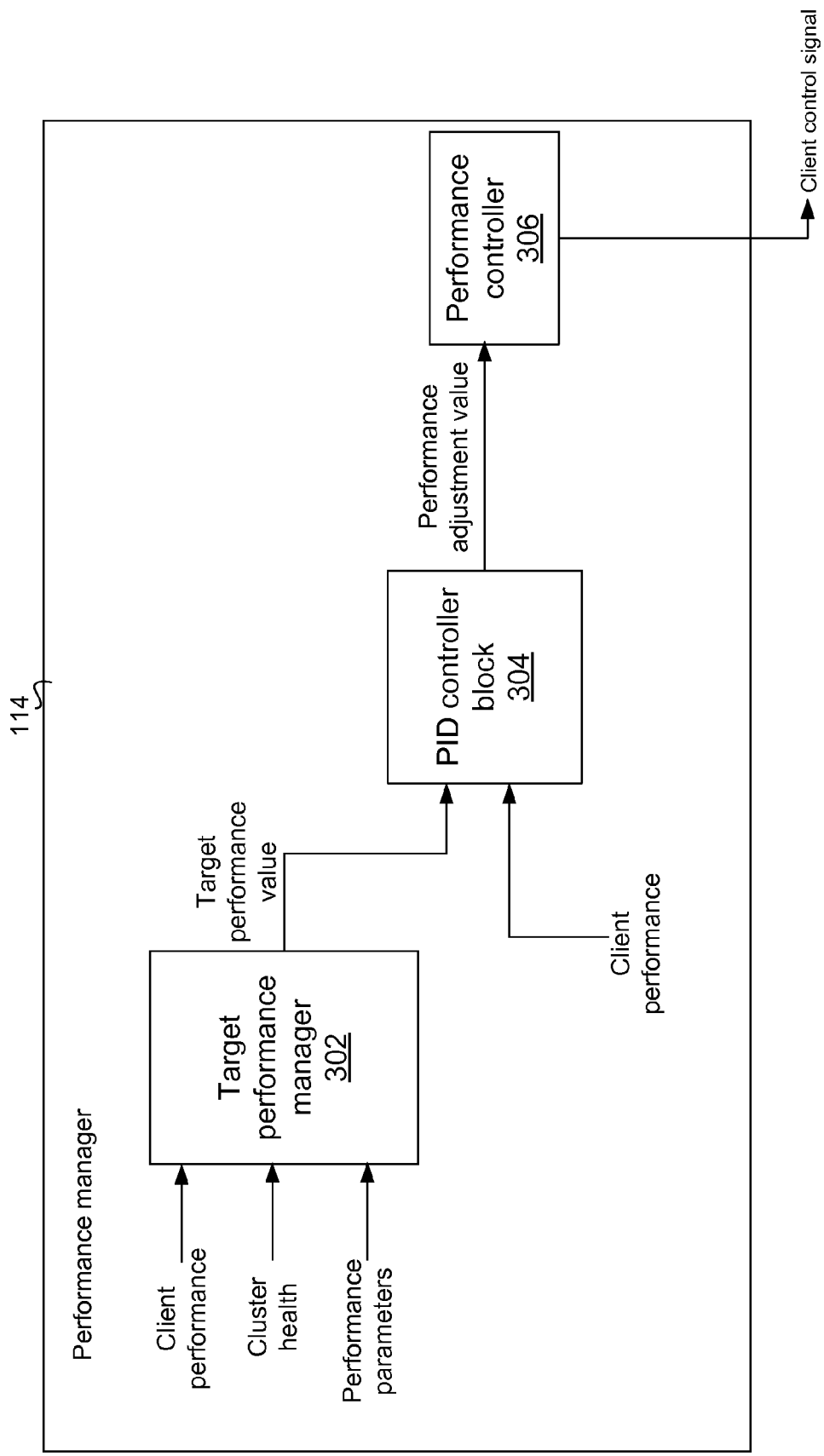
FIG. 3 depicts a more detailed example of adjusting performance using a performance manager according to one embodiment.

Performance manager 114 may use different ways of adjusting performance. FIG. 3 depicts a more detailed example of adjusting performance using performance manager 114 according to one embodiment. A target performance manager 302 determines a target performance value. In one embodiment, target performance manager 302 uses client performance, cluster health, and performance parameters to determine the target performance value. As discussed above, client performance may be historical and current client performance. Client performance may be measured based on a performance metric, such as in IOPS, bytes, or latency in milliseconds.

Cluster health quantifies the current load of the cluster. For example, cluster health may be expressed in a percentage based on the current load of the cluster. In one example, a cluster that is overloaded with processing requests may have a lower cluster health than when the system is not overloaded.

Performance parameters may be set by an administrator. In one embodiment, performance parameters may be minimum, maximum, and burst parameters. Using IOPS as an example, a minimum IOPS value is the IOPS value at which the volume will perform when the cluster is at an overload situation. An overload situation may be when the cluster health is above a utilization threshold, such as 50%. It may include information global to the cluster, or local to the volume server. Other events may also affect the performance of the cluster. A maximum IOPS parameter is the maximum sustained IOPS value over an extended period of time. The burst IOPS parameter is used to determine an amount of credits that a client 108 can accrue while not using the volume at its maximum performance. The credits can later be used to "burst" above the maximum IOPS parameter for a short period of time. The administrator may input these values into target performance manager 302 and those values are used to determine the target performance value for client 108. These parameters may also be dynamically adjusted during runtime by the administrator, such as when a higher level of performance is desired (e.g., the customer paid for a higher level of performance).

Target performance manager 302 outputs the target performance value to a proportion-integral-derivative (PID) controller block 304. PID controller block 304 may include a number of PID controllers for different performance metrics. Although PID controllers are described, other controllers may be used to control the performance of clients 108. In one example, PID controller block 304 includes PID controllers for IOPS, bandwidth, and latency. Target performance manager 302 outputs different target performance values for the performance metrics into the applicable PID controllers. The PID controllers also receive information about previous and/or current client performance the target performance value, and then determine a client performance adjustment value. For example, a PID controller is configured to take feedback of previous client performance and determine a value to cause a system to move towards the target performance value. For example, an action that applies varied amounts of pressure, where pressure in this case causes client 108 to slow down, speed up or stay the same in performing IOPs. In one example, if the target performance value is 110 IOPS and client 108 has been operating at 90 IOPS, then the client performance adjustment value is output, which indicates client 108 should increase the number of IOPS being performed.

In one embodiment, PID controller block 304 outputs a pressure to apply in milliseconds that will cause client performance to move towards the target performance value. For example, a time in milliseconds is output that is used to determine how long to lock a client 108 out of a volume for a period of time. Also, the pressure may inject latency into the requests or be a number of IOPS that client 108 can perform. Locking client 108 out of the volume for different times changes the number IOPS performed by client 108. For example, locking client 108 out of the volume for shorter periods of time increases the number of IOPS that can be performed by client 108 during that period.

A performance controller 306 receives the performance adjustment value and outputs a client control signal to control the performance of client 108. For example, the amount of lockout may be calculated and applied every ½ second. In one embodiment, clients 108 are locked out by closing and opening a command window, such as an Internet small computer system interface (iSCSI) command window. Closing the command window does not allow a client 108 to issue access requests to a volume and opening the command window allows a client 108 to issue access requests to the volume. Locking clients 108 out of a volume may adjust the number of IOPS, bandwidth, or latency for client 108. For example, if a client 108 is locked out of a volume every 50 milliseconds for every 500 milliseconds as compared to being locked out of the volume for 450 milliseconds every 500 milliseconds, the client may issue more IOPS. For a bandwidth example, if bandwidth is constrained, then client 108 is locked out of a volume for a longer period of time to increase available bandwidth.

Using the above system, clients 108 may be offered performance guarantees based on performance metrics, such as IOPS. For example, given that system 100 can process a total amount of IOPS, the total amount may be divided among different clients 108 in terms of a number of IOPS within the total amount. The IOPS are allocated using the min, max, and burst. If it is more than the total possible then, the administrator is notified that too many IOPS are being guaranteed and to either add more performance capacity or change the IOP guarantees. This notification may be before a capacity threshold is reached (e.g., full capacity or a pre-defined threshold below full capacity). The notification can be sent before the capacity is reached because client performance is characterized in terms to IOPS and the administrator can be alerted that performance is overprovisioned by N number of IOPS. For example, clients 108 may be guaranteed to be operating between a minimum and maximum number of IOPS over time (with bursts above the maximum at certain times). Performance manager 114 can guarantee performance within these parameters using the above system. Because load is evenly distributed, hot spots will not occur and system 100 may operate around the total amount of IOPS regularly. Thus, without hot spot problems and with system 100 being able to provide the total amount of IOPS regularly, performance may be guaranteed for clients 108 as the number of IOPS performed by clients 108 are adjusted within the total to make sure each client is operating within the performance parameters for each given client 108. Since each client's effect on a global pool of performance is measured and predictable, the administrator can consider the entire cluster's performance as a pool of performance as opposed to individual nodes, each with their own performance limits. This allows the cluster to accurately characterize its performance and guarantee its ability to deliver performance amongst all of its volumes.

Figure 4:
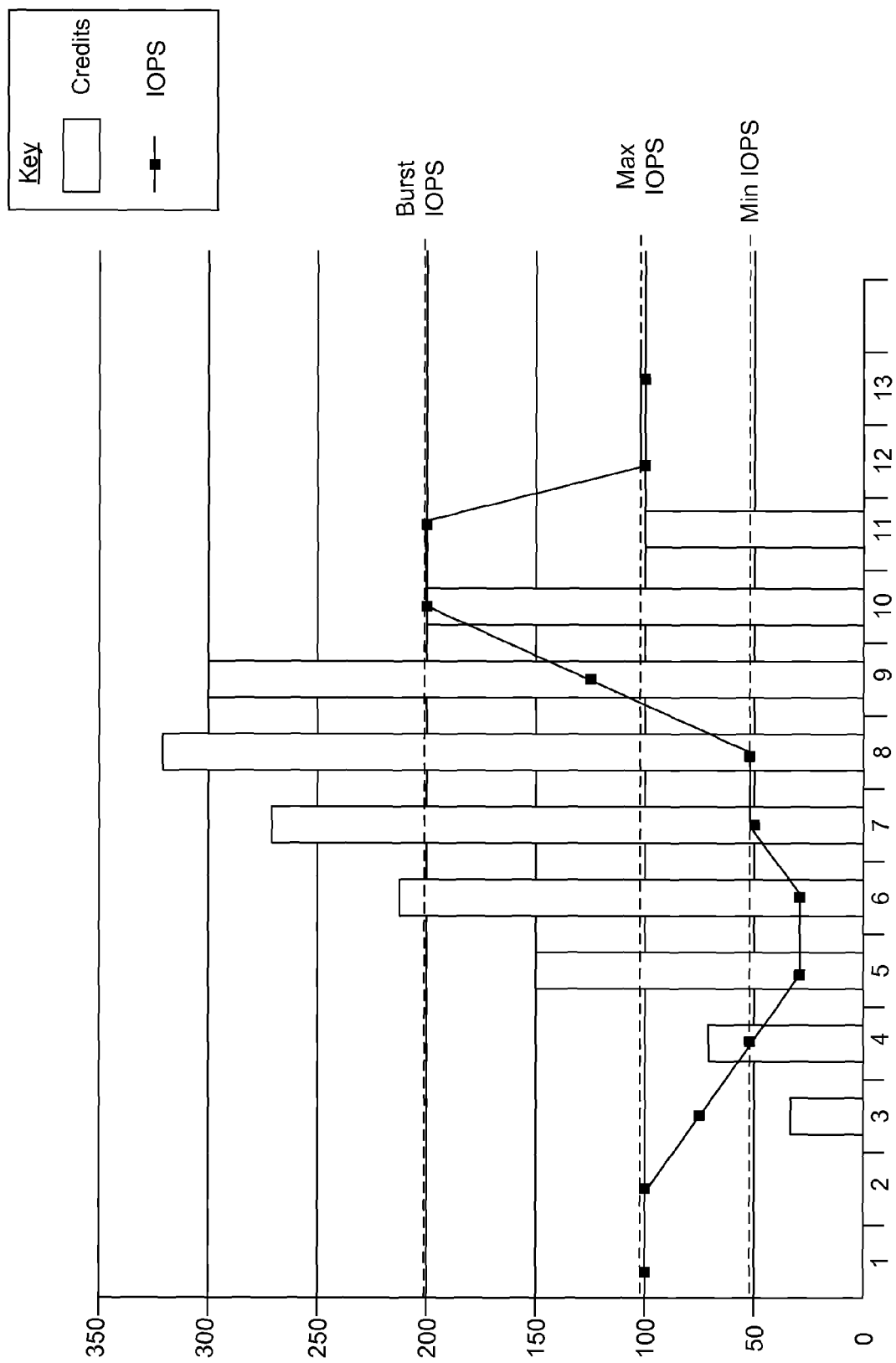
FIG. 4 depicts a graph of a number of IOPS performed by client over a time period according to one embodiment.

FIG. 4 depicts a graph 400 of a number of IOPS performed by client 108 over a time period according to one embodiment. A Y-axis shows the number of IOPS performed per second. Periods of a ½ second are shown on the X-axis. Credits are shown that are accumulated when the number of IOPS are below the max IOPS level (100 IOPS). As shown, credits increase gradually from time periods 1-8. As client 108 bursts above the max IOPS value, the number of credits starts to decrease starting from time period 9. As shown, from time period 9-12, the number of IOPS reaches the burst IOPS level. Then, from time period 13 on, client 108 is operating at the max IOPS level and the number of credits does not increase.

Accordingly, performance management is provided based on the distributed data striping architecture. Because data is evenly striped across all drives in the cluster, the load of each individual volume is also equal across every single drive in storage system 100. This may remove hot spots and allows performance management to be accurate and fairly provisioned and to guarantee an entire cluster performance for individual volumes.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   determining a previous client performance value in terms of a performance metric for a volume in a storage system, the previous client performance value related to previous access for a client to the volume, wherein the storage system is storing data for a plurality of volumes where data for each of the plurality of volumes is striped substantially evenly across drives of the storage system;
   receiving a set of performance parameters comprising a maximum performance value, a minimum performance value, and a maximum burst value above the maximum value;
   determining client performance is below the maximum performance value;
   accumulating burst credits for the client based upon determining the client performance is below the maximum performance value;
   determining a target performance value based on the previous client performance value, the set of performance parameters, and the burst credits for the client, wherein the target performance value is above the maximum performance value; and
   regulating, by a computing device, performance of the client with respect to access to the volume in terms of the performance metric based on the target performance value.

2. The method of claim 1, wherein regulating comprises restricting access to the volume for the client based on the target performance value.

3. The method of claim 2, wherein restricting access comprises not allowing a client to perform access commands during a lockout time in a period of time.

4. The method of claim 2, wherein:
   if the target performance value is greater than the previous performance value, decreasing the lockout time for the period, and
   if the target performance value is less than the previous performance value, increasing the lockout time for the period.

5. The method of claim 1, wherein the performance metric comprises an input/output operations per second metric, a bandwidth metric, or a latency metric.

6. The method of claim 1, further comprising:
   receiving health information representing load in the storage system, wherein the target performance value is based on the health information.

7. The method of claim 1, wherein the storage system comprises solid state drives.

8. The method of claim 1, wherein load across drives in the storage system is substantially even due to the data for a plurality of volumes being striped substantially evenly across drives of the storage system.

9. The method of claim 1, further comprising sending a notification message indicating performance guaranteed to clients across drives in the storage system is greater than a capacity threshold in the storage system before actual capacity reaches the capacity threshold.

10. The method of claim 1, further comprising decreasing the burst credits based upon the target performance value being above the maximum performance value.

11. An apparatus comprising:
    one or more computer processors; and
    a computer-readable storage medium comprising instructions for controlling the one or more computer processors to be operable to:
    determine a previous client performance value in terms of a performance metric for a volume in a storage system, the previous client performance value related to previous access for a client to the volume, wherein the storage system is storing data for a plurality of volumes where data for each of the plurality of volumes is striped substantially evenly across drives of the storage system;
    receive a set of performance parameters comprising a maximum performance value, a minimum performance value, and a maximum burst value above the maximum value;
    determine client performance is below the maximum performance value;
    accumulate burst credits for the client based upon determining the client performance is below the maximum performance value;
    determine a target performance value based on the previous client performance value, the set of performance parameters, and the burst credits for the client, wherein the target performance value is above the maximum performance value; and
    regulate performance of the client with respect to access to the volume in terms of the performance metric based on the target performance value.

12. The apparatus of claim 11, wherein to regulate performance of the client the one or more computer processors are operable to restrict access to the volume for the client based on the target performance value.

13. The apparatus of claim 12, wherein to restrict access to the volume the one or more computer processors are operable to not allow a client to perform access commands during a lockout time in a period of time.

14. The apparatus of claim 11, wherein the performance metric comprises an input/output operations per second metric, a bandwidth metric, or a latency metric.

15. The apparatus of claim 11, wherein the computer-readable storage medium comprise further instructions for controlling the one or more computer processors to be operable to:

receiving health information representing load in the storage system, wherein the target performance value is based on the health information.

16. The apparatus of claim 11, wherein the storage system comprises solid state drives.

17. The apparatus of claim 11, wherein load across drives in the storage system is substantially even due to the data for a plurality of volumes being striped substantially evenly across drives of the storage system.

18. A non-transitory computer-readable storage medium containing instructions for controlling a computer system to be operable to:

determine a previous client performance value in terms of a performance metric for a volume in a storage system, the previous client performance value related to previous access for a client to the volume, wherein the storage system is storing data for a plurality of volumes where data for each of the plurality of volumes is striped substantially evenly across drives of the storage system;

receive a set of performance parameters comprising a maximum performance value, a minimum performance value, and a maximum burst value above the maximum value;

determine client performance is below the maximum performance value;

accumulate burst credits for the client based upon determining the client performance is below the maximum performance value;

determine a target performance value based on the previous client performance value, the set of performance parameters, and the burst credits for the client, wherein the target performance value is above the maximum performance value; and regulate performance of the client with respect to access to the volume in terms of the performance metric based on the target performance value.

19. The non-transitory computer-readable storage medium of claim 18, wherein to regulate performance of the client the computer system is operable to restrict access to the volume for the client based on the target performance value.

20. The non-transitory computer-readable storage medium of claim 19, wherein to restrict access to the volume the computer system is operable to not allow a client to perform access commands during a lockout time in a period of time.

\* \* \* \* \*